United States Patent
Inagaki et al.

(10) Patent No.: US 7,910,247 B2
(45) Date of Patent: Mar. 22, 2011

(54) NONAQUEOUS ELECTROLYTE BATTERY

(75) Inventors: Hiroki Inagaki, Kawasaki (JP);
Yoshinao Tatebayashi, Yokohama (JP);
Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/707,444

(22) Filed: Feb. 17, 2010

(65) Prior Publication Data

US 2010/0143790 A1   Jun. 10, 2010

Related U.S. Application Data

(63) Continuation of application No. 10/943,857, filed on Sep. 20, 2004, now abandoned.

(30) Foreign Application Priority Data

Sep. 24, 2003   (JP) .................................. 2003-332109

(51) Int. Cl.
*H01M 2/00* (2006.01)
(52) U.S. Cl. .................................. 429/231.95; 429/163
(58) Field of Classification Search ............. 429/231.95, 429/231.8, 218.1, 216, 306, 163, 221, 231.5
See application file for complete search history.

(56) References Cited

U.S. PATENT DOCUMENTS

| | | | |
|---|---|---|---|
| 5,993,997 A | 11/1999 | Fujimoto et al. | |
| 6,274,271 B1 | 8/2001 | Koshiba et al. | |
| 6,537,697 B2 * | 3/2003 | Kida et al. ................... | 429/199 |
| 6,749,648 B1 | 6/2004 | Kumar et al. | |
| 7,049,032 B2 | 5/2006 | Tsushima et al. | |
| 7,462,425 B2 | 12/2008 | Takami et al. | |
| 7,482,090 B2 | 1/2009 | Tatebayashi et al. | |
| 7,582,386 B2 | 9/2009 | Takami et al. | |
| 7,595,134 B2 | 9/2009 | Inagaki et al. | |
| 7,601,463 B2 | 10/2009 | Inagaki et al. | |
| 7,629,081 B2 | 12/2009 | Inagaki et al. | |
| 7,662,515 B2 | 2/2010 | Inagaki et al. | |
| 2001/0014422 A1 | 8/2001 | Omaru et al. | |
| 2003/0049541 A1 | 3/2003 | Inagaki et al. | |
| 2003/0215711 A1 * | 11/2003 | Aramata et al. ........... | 429/218.1 |

(Continued)

FOREIGN PATENT DOCUMENTS

JP        9-199179        7/1997

(Continued)

OTHER PUBLICATIONS

B. A. Boukamp, et al., "All-Solid Lithium Electrodes with Mixed-Conductor Matrix", J. Electrochem. Soc., Electrochemical Science and Technology, Apr. 1981, vol. 128, pp. 725-729.

(Continued)

*Primary Examiner* — Jennifer Michener
*Assistant Examiner* — Monique Wills
(74) *Attorney, Agent, or Firm* — Oblon, Spivak, McClelland, Maier & Neustadt, L.L.P.

(57) ABSTRACT

A nonaqueous electrolyte battery includes a case, a nonaqueous electrolyte provided in the case, a positive electrode provided in the case, and a negative electrode provided in the case, including a negative electrode active material and an electronic conductor containing a carbonaceous material, wherein a negative electrode working potential is nobler at least 1 V than a lithium electrode potential, and the carbonaceous material has a spacing ($d_{002}$) of (002) plane of 0.344 nm or more and 0.352 nm or less, and a crystallite size (Lc) in the C-axis direction of 10 nm or less.

4 Claims, 1 Drawing Sheet

U.S. PATENT DOCUMENTS

| | | |
|---|---|---|
| 2004/0209156 A1* | 10/2004 | Ren et al. .................. 429/49 |
| 2005/0164082 A1 | 7/2005 | Kishi et al. |
| 2005/0221188 A1 | 10/2005 | Takami et al. |
| 2006/0068272 A1 | 3/2006 | Takami et al. |
| 2006/0068282 A1 | 3/2006 | Kishi et al. |
| 2006/0134520 A1 | 6/2006 | Ishii et al. |
| 2006/0216600 A1 | 9/2006 | Inagaki et al. |
| 2007/0009794 A1 | 1/2007 | Takami et al. |
| 2007/0009798 A1 | 1/2007 | Inagaki et al. |
| 2007/0059592 A1 | 3/2007 | Takami et al. |
| 2007/0059602 A1 | 3/2007 | Morishima et al. |
| 2007/0072080 A1 | 3/2007 | Inagaki et al. |
| 2007/0231690 A1 | 10/2007 | Fujita et al. |
| 2007/0231693 A1 | 10/2007 | Inagaki et al. |
| 2007/0231702 A1 | 10/2007 | Fujita et al. |
| 2007/0281214 A1 | 12/2007 | Saruwatari et al. |
| 2008/0070115 A1 | 3/2008 | Saruwatari et al. |
| 2008/0176142 A1 | 7/2008 | Inagaki et al. |
| 2009/0291354 A1 | 11/2009 | Inagaki et al. |

FOREIGN PATENT DOCUMENTS

| | | |
|---|---|---|
| JP | 10-69922 | 3/1998 |
| JP | 2006-059558 | 3/2006 |

OTHER PUBLICATIONS

Ram A. Sharma, et al., "Thermodynamic Properties of the Lithium-Silicon System", J. Electrochem. Soc., Electrochemical Science and Technology, Dec. 1976, vol. 123, pp. 1763-1768.

J. R. Dahn, "Phase Diagram of $Li_xC_6$", Physical Review B, vol. 44, No. 17, Nov. 1, 1991, pp. 9170-9177.

U.S. Appl. No. 12/428,131, filed Apr. 22, 2009, Inagaki et al.

* cited by examiner

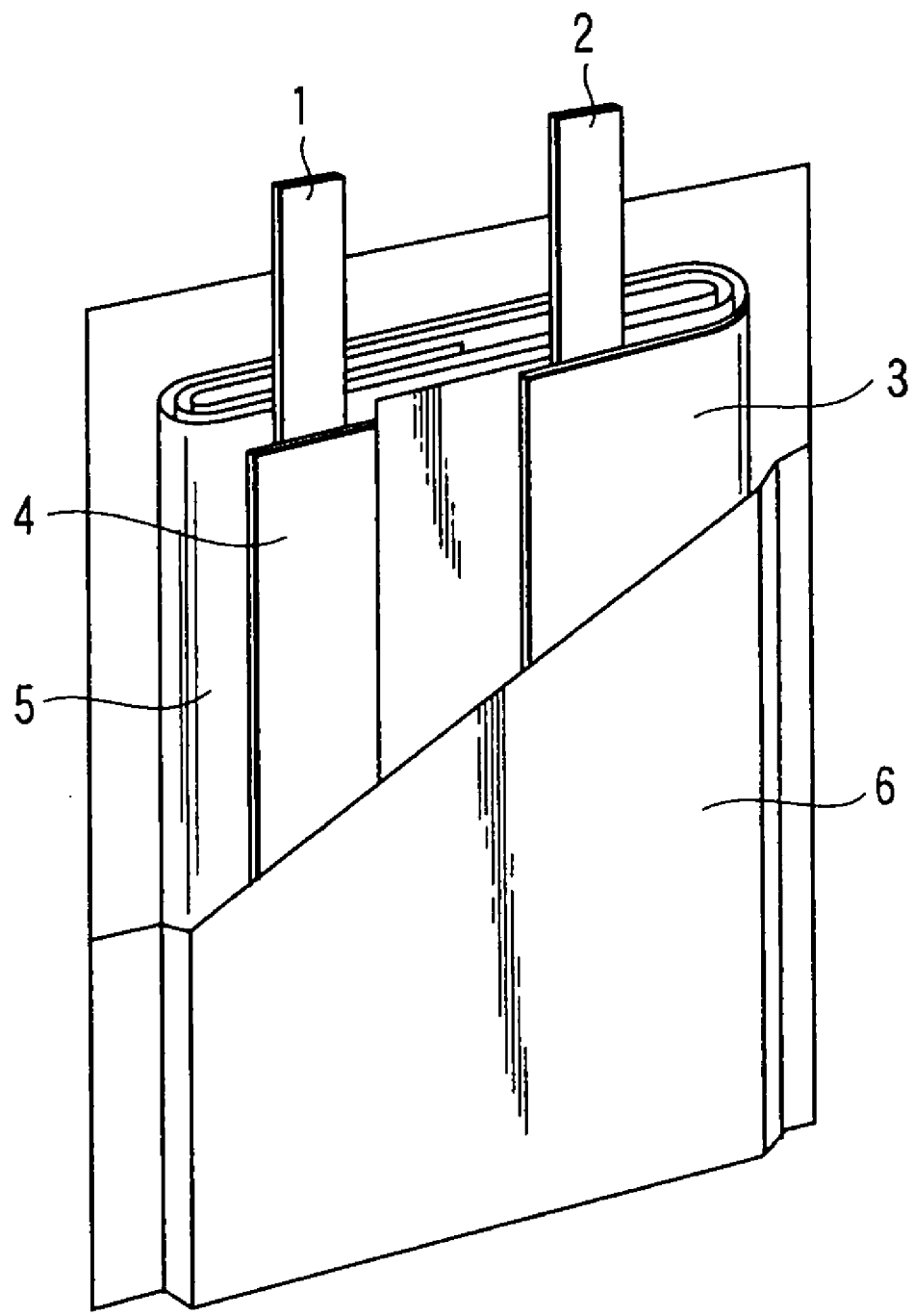
FIGURE

NONAQUEOUS ELECTROLYTE BATTERY

CROSS-REFERENCE TO RELATED APPLICATIONS

This application is a continuation of U.S. application Ser. No. 10/943,857 filed Sep. 20, 2004, and is based upon and claims the benefit of priority from prior Japanese Patent Application No. 2003-332109, filed Sep. 24, 2003, the entire contents of each of which are incorporated herein by reference.

BACKGROUND OF THE INVENTION

1. Field of the Invention

The present invention relates to a nonaqueous electrolyte battery. The invention is applicable to both a nonaqueous electrolyte primary battery and a nonaqueous electrolyte secondary battery.

2. Description of the Related Art

Electronic appliances are becoming smaller in size and lighter in weight recently owing to rapid technical progress in the field of electronics. As a result, cordless and portable electronic appliances are being more prevalent, and secondary batteries used as a driving source are demanded to be smaller in size, lighter in weight, and higher in energy density. To meet such demands, lithium secondary batteries of high energy density are being developed. Lately, ultrathin lightweight secondary batteries using a case of laminate film containing aluminum are being developed and sold on market.

The secondary battery using a case of a laminate film containing aluminum changes in battery thickness due to volume expansion and contraction of an electrode by charging and discharging. As a result, the battery may be deformed, the electrode interval widened, which increases the battery resistance, thus the battery characteristics may be lowered.

To avoid such problems, negative electrode active materials are proposed in Jpn. Pat. Appln. KOKAI Publication No. 9-199179. In the publication, the negative electrode active material is made of lithium titanate or a carbon material of which spacing of (002) plane by an X-ray wide angle diffraction method is 3.7 Å or more, whereby it is intended to decrease expansion and contraction of the electrode due to reversible intercalation and deintercalation of lithium, thereby reducing expansion of an electrode group. Lithium titanate is hardly changed in volume due to charging and discharging, and is hence very small in change of battery thickness. By using this compound in the negative electrode active material, the above problems can be solved.

However, since lithium titanate is poor in conductivity, when the negative electrode is manufactured without adding an electronic conductor as in the publication, the battery is inferior under heavy currents. When the conductivity of the negative electrode active material is low, by adding an electronic conductor made of carbon material to the negative electrode active material, it is known that the high rate characteristic is improved. However, in a nonaqueous electrolyte battery having a negative electrode containing an electronic conductor made of a carbon material and lithium titanate, when the battery is stored in a high temperature environment, or when charging and discharging operation is repeated in a high temperature environment, the electronic conductor reacts with an electrolysis solution, and a large volume of gas is generated, thus the battery characteristics are extremely lowered.

BRIEF SUMMARY OF THE INVENTION

It is an object of the invention to provide a nonaqueous electrolyte battery excellent in charging and discharging characteristics in a high temperature environment, and high in safety and reliability.

According to a first aspect of the present invention, there is provided a nonaqueous electrolyte battery comprising:
a case;
a nonaqueous electrolyte provided in the case;
a positive electrode provided in the case; and
a negative electrode provided in the case, including a negative electrode active material and an electronic conductor containing a carbonaceous material,
wherein a negative electrode working potential is nobler at least 1 V than a lithium electrode potential, and the carbonaceous material has a spacing ($d_{002}$) of (002) plane of 0.344 nm or more and 0.352 nm or less, and a crystallite size (Lc) in the C-axis direction of 10 nm or less.

According to a second aspect of the present invention, there is provided a nonaqueous electrolyte battery comprising:
a case;
a nonaqueous electrolyte provided in the case;
a positive electrode provided in the case; and
a negative electrode provided in the case, including a negative electrode active material and an electronic conductor containing a carbonaceous material,
wherein the negative electrode active material contains at least one compound selected from the group consisting of tungsten oxide, molybdenum oxide, iron sulfide, titanium sulfide, and composite oxide containing lithium and titanium, and the carbonaceous material has a spacing ($d_{002}$) of (002) plane of 0.344 nm or more and 0.352 nm or less, and a crystallite size (Lc) in the C-axis direction of 10 nm or less.

BRIEF DESCRIPTION OF THE SEVERAL VIEWS OF THE DRAWING

The single FIGURE is a partially cut-away perspective view of a nonaqueous electrolyte battery according to an embodiment of the invention.

DETAILED DESCRIPTION OF THE INVENTION

In a negative electrode containing a carbonaceous material that intercalates and deintercalates lithium as a negative electrode active material, it is known that a protective film, called a solid electrolyte interface (SEI), is formed on the negative electrode surface at the time of initial charge. However, in a nonaqueous electrolyte battery having a negative electrode containing a negative electrode active material, such as lithium titanate, which imparts a negative electrode working potential nobler at least 1 V than a lithium electrode potential, even if a carbonaceous material is contained as an electronic conductor in the negative electrode, the reaction of forming the protective film does not take place, so that the carbonaceous material of the negative electrode and nonaqueous electrolyte react in a high temperature environment, and gas generation is increased in a high temperature environment, as studied and disclosed by the present inventors.

In the negative electrode containing acetylene black or carbon black as an electronic conductor and the negative electrode active material such as lithium titanate, the negative electrode working potential is nobler at least 1 V than the lithium electrode potential. Since the particle size of acetylene black and carbon black is small, aggregation is like to occur in the negative electrode. Accordingly, the electronic conductor does not disperse uniformly in the active material, and current collection failure is likely to occur. Since such an electronic conductor has many functional groups on its surface and a large specific surface area, it is likely to react with the electrolysis solution, thereby promoting gas generation in a high temperature environment.

The inventors have conducted further research, and discovered that gas generation in a high temperature environment can be suppressed even if a protective film is not formed, while obtaining high conductivity, by specifying both a spacing $d_{002}$ of (002) plane and a crystallite size Lc in the C-axis direction of a carbonaceous material within specific ranges.

The carbonaceous material used in an embodiment of the invention is specified as follows: the spacing ($d_{002}$) of (002) plane is 0.344 nm or more and 0.352 nm or less, and the crystallite size (Lc) in the C-axis direction is 10 nm or less. The carbonaceous material having such properties is less likely to aggregate and more likely to mix easily with the negative electrode active material in the solvent, as compared with acetylene black and carbon black of which spacing or crystallite size is outside the specified range. Therefore, a conductive network can be favorably built up in the negative electrode, and a nonaqueous electrolyte battery having an excellent high rate characteristic can be realized. Further, the carbonaceous material does not react with a nonaqueous electrolyte even in a high temperature environment, and gas generation can be suppressed, so that even in a flat battery having a laminate film case which is more likely to be deformed than a metal case, battery deformation does not occur, and a favorable battery performance can be maintained.

The reason for defining the spacing ($d_{002}$) and crystallite size Lc in the specified ranges will be more specifically explained below. Even at the crystallite size Lc of 10 nm or less, if the spacing ($d_{002}$) is less than 0.344 nm, the reactivity is increased between the nonaqueous electrolyte and an edge surface of a carbon layer composing a graphite crystallite, so that the gas generation increases in high temperature storage. On the other hand, if the spacing ($d_{002}$) exceeds 0.352 nm, surface functional groups increase in number, and the functional groups react with the nonaqueous electrode in high temperature storage, so that the gas generation also increases in high temperature storage. A more preferred range of the spacing ($d_{002}$) is 0.345 nm or more and 0.35 nm or less.

Even when the spacing ($d_{002}$) is 0.344 nm or more and 0.352 nm or less, if the crystallite size Lc exceeds 10 nm, the reactivity between the nonaqueous electrolyte and the edge surface of the carbon layer increases, so that the gas generation increases in high temperature storage. If the crystallite size Lc is less than 0.1 nm, since growth of the graphite structure is insufficient, the conductivity may be insufficient, and surface functional groups of the carbonaceous material may increase. Accordingly, the crystallite size Lc is preferred to be 0.1 nm or more and 10 nm or less, and a more preferable range is 1 nm or more and 3 nm or less.

The average particle size of the carbonaceous material is preferred to be 0.1 μm or more in order to suppress gas generation effectively. To build a favorable conductive network, the average particle size of the carbonaceous material is preferred to be 10 μm or less.

The specific surface area of the carbonaceous material is preferred to be 10 $m^2/g$ or more in order to build a favorable conductive network. To suppress gas generation effectively, the specific surface area of the carbonaceous material is preferred to be 100 $m^2/g$ or less.

An embodiment of a nonaqueous electrolyte battery according to the invention will be described below.

The nonaqueous electrolyte battery comprises an electrode group including a positive electrode, a negative electrode, a separator provided between the positive electrode and the negative electrode, a nonaqueous electrolyte held in the electrode group, and a case for accommodating the electrode group.

The positive electrode, negative electrode, separator, nonaqueous electrolyte, and case will be specifically described below.

1) Positive Electrode

The positive electrode comprises a positive electrode current collector, and a positive electrode layer provided on one side or both sides of the positive electrode current collector. The positive electrode layer includes an active material and a binder.

The positive electrode current collector can be made of, for example, aluminum or aluminum alloy.

The positive electrode active material can be made of various oxides, sulfides and the like. Examples of the positive electrode active material include manganese dioxide ($MnO_2$), iron oxide, copper oxide, nickel oxide, lithium manganese composite oxide such as $Li_xMn_2O_4$ or $Li_xMnO_2$, lithium nickel composite oxide such as $Li_xNiO_2$, lithium cobalt composite oxide such as $Li_xCoO_2$, lithium nickel cobalt composite oxide such as $LiNi_{1-y}Co_yO_2$, lithium manganese cobalt composite oxide such as $LiMn_yCo_{1-y}O_2$, spinel type lithium manganese nickel composite oxide such as $Li_xMn_{2-y}Ni_yO_4$, lithium phosphorus oxide having an olivine structure such as $Li_xFePO_4$, $Li_xFe_{1-y}Mn_yPO_4$, $Li_xCoPO_4$, iron sulfate such as $Fe_2(SO_4)_3$, and vanadium oxide such as $V_2O_5$. Values of x and y are preferred to be in a range of 0 to 1. Other examples include a conductive polymer material such as polyaniline and polypyrrole, a disulfide polymer material, sulfur (S), an organic material such as carbon fluoride, and an inorganic material.

Since a preferred positive electrode active material is desired to have a high positive electrode voltage, preferred examples include lithium manganese composite oxide such as $Li_xMn_2O_4$, lithium nickel composite oxide, lithium cobalt composite oxide, lithium nickel cobalt composite oxide, spinel type lithium manganese nickel composite oxide, lithium manganese cobalt composite oxide, and lithium iron phosphate such as $Li_xFePO_4$.

As the electronic conductor, for example, acetylene black, carbon black, and graphite can be used.

As the binder, for example, polytetrafluoroethylene (PTFE), polyvinylidene fluoride (PVdF), and fluororubber can be used.

The blending ratio of the positive electrode active material, the electronic conductor, and the binder is 80 to 95 wt.% of the positive electrode active material, 3 to 18 wt.% of the electronic conductor, and 2 to 17 wt. % of the binder.

2) Negative Electrode

The negative electrode comprises a negative electrode current collector, and a negative electrode layer provided on one side or both sides of the negative electrode current collector. The negative electrode layer contains a negative electrode active material which imparts a negative electrode working potential nobler at least 1 V than a lithium electrode potential.

The negative electrode current collector can be made of aluminum or aluminum alloy.

The negative electrode active material contains a material which imparts a negative electrode working potential nobler at least 1 V vs. $Li/Li^+$. Examples of such a negative electrode active material include tungsten oxide, molybdenum oxide, iron sulfide, titanium sulfide, and composite oxides containing lithium and titanium such as lithium titanate. In particular, lithium titanate is excellent in cycle characteristic, and among others lithium titanate that has a spinel structure and a chemical formula $Li_{4+x}Ti_5O_{12}$ ($0 \leq x \leq 3$) is preferred. The potential difference between the negative electrode working potential and the lithium electrode potential is preferred to be 1 V or more and 2 V or less. The negative electrode active material can be composed of one type or two or more types.

The specific surface area of lithium titanate is preferred to be 1 to 10 $m^2/g$. The specific surface area is measured by a BET method. The reason is explained below. If the specific surface area is less than 1 $m^2/g$, the effective area of the active material contributing to electrode reaction is small, and the high rate discharge characteristic may decline. If the specific surface area exceeds 10 $m^2/g$, the reaction of the negative electrode active material and electrolyte increases, so that the charge and discharge efficiency may decline or gas generation in storage may be promoted.

Among iron sulfides, $FeS_x$ (molar ratio x denotes $1.08 \leq x \leq 1.33$) is preferred. In particular, $FeS_x$ of which the molar ratio x is in a range of $1.08 \leq x \leq 1.2$ is preferred because the high capacity and long cycle life of a secondary battery can be established at the same time. A more preferred range of the molar ratio x is 1.09 or more and 1.12 or less.

Among $FeS_x$ compounds, preferred examples are $Fe_9S_{10}$ ($FeS_{1.11}$), $Fe_{10}S_{11}$ ($FeS_{1.1}$), and $Fe_{11}S_{12}$ ($FeS_{1.09}$).

The average primary particle size of the negative electrode active material is preferred to be 1 μm or less. As a result, the cycle performance can be enhanced. This effect is particularly notable in high rate discharge. This is because, in the negative electrode active material for intercalating and deintercalating lithium ions, the lithium ion diffusion distance in the active material is shorter when the primary particle size is smaller, and hence the specific surface area increases. A more preferred average primary particle size is 0.3 μm or less. However, if the primary particle size is too small, primary particles are likely to aggregate, and the negative electrode held the nonaqueous electrolyte too much, thereby causing depletion of the electrolyte at the positive electrode. Accordingly, the lower limit is preferred to be 0.001 μm.

The negative electrode layer further contains an electronic conductor. The electronic conductor includes a carbonaceous material. The carbonaceous material is preferred to have a spacing ($d_{002}$) of (002) plane of 0.344 nm or more and 0.352 nm or less, and crystallite size (Lc) in the C-axis direction of 10 nm or less.

The type of the carbonaceous material is not particularly specified, but it is preferred to be derived from coke, rather than carbon black and acetylene black.

The carbonaceous material, such as coke, can intercalate and/or deintercalate lithium. And the carbonaceous material that is not capable to intercalate and deintercalate lithium can be used.

The average particle size of the carbonaceous material is preferred to be 0.1 μm or more in order to suppress gas generation effectively. To build a favorable conductive network, the average particle size of the carbonaceous material is preferred to be 10 μm or less. By controlling the average particle size of the carbonaceous material in a range of 0.1 μm or more and 10 μm or less, a favorable high temperature characteristic can be realized.

In order to enhance the high rate characteristic while maintaining a favorable high temperature performance, the carbonaceous material is preferred to have a particle size distribution in the following range.

The particle size distribution of the carbonaceous material is obtained by integrating the volume from smaller particle sizes. The particle size distribution is preferred to satisfy the following conditions of (a) to (c). Incidentally, the integrated volume is defined as 100%.

(a) A particle size D10 is a particle size that gives 10% of the integrated volume. The particle size D10 can be 0.1 μm or more and 10 μm or less.

(b) A particle size D50 is a particle size that gives 50% of the integrated volume. The particle size D50 can be 5 μm or more and 20 μm or less.

(c) A particle size D90 is a particle size that gives 90% of the integrated volume. The particle size D90 can be 10 μm or more and 30 μm or less.

If D90 is lower than 10 μm, the carbonaceous material is buried in the space between the negative electrode active material particles, the diffusion resistance of electrons in the thickness direction of the electrode increases, and the high rate characteristic may decline. On the other hand, if D90 is more than 30 μm, the contact area of the carbonaceous material and the negative electrode active material decreases, and also the diffusion resistance of electrons in the thickness direction of the electrode increases, so that the high rate characteristic may decline. A more preferred range of D90 is 12 μm or more and 20 μm or less.

While D90 is in a range of 10 μm or more and 30 μm or less, if D10 is more than 10 μm, the particle size difference between large particles and small particle is small. Therefore, very few particles gather on one particle, a conductive network is not built sufficiently, and the diffusion resistance of electrons in the thickness direction of the electrode may increase. On the other hand, if D10 is less than 0.1 μm, the reactivity of the carbonaceous material with the nonaqueous electrolyte is increased, and gas generation in a high temperature environment may be increased.

A more preferred range of D10 is 1 μm or more and 3 μm or less.

In the range of D90 to 10 μm or more and 30 μm or less and D10 of 0.1 μm or more and 10 μm or less, if D50 is more than 20 μm, the particle size distribution concentrates on large particle sizes. Therefore, only large particles gather around large particles, the diffusion resistance of electrons may increase in the thickness direction of the electrode. On the other hand, in the range of D90 to 10 μm or more and 30 μm or less and D10 of 0.1 μm or more and 10 μm or less, if D50 is less than 5 μm, the particle size distribution concentrates on small particle sizes. As a result, the electron diffusion route of each particle is short, and electrons are diffused through many particles. Therefore, the diffusion resistance of electrons may increase in the thickness direction of the electrode. A more preferred range of D50 is 7 μm or more and 15 μm or less.

The profile of particle size distribution satisfying the conditions of (a) to (c) is broad, and particles are present uniformly from a small size to a large size. Therefore, multiple particles gather around one particle, and the electron diffusion route can be formed like a network on the electrode. Further, since large particles are present in an appropriate amount, electrons can be diffused promptly in the thickness direction of the electrode. As a result, the diffusion path of electrons in the thickness direction of the electrode is formed favorably, and diffusion resistance of electrons in the thickness direction of electron can be lowered, so that the high rate characteristic of the nonaqueous electrolyte battery can be enhanced.

The specific surface area of the carbonaceous material is preferred to be 10 $m^2/g$ or more in order to build a favorable conductive network. To suppress gas generation effectively, the specific surface area of the carbonaceous material is preferred to be 100 $m^2/g$ or less.

The effect of the invention is achieved as far as the electronic conductor is mainly made of the carbonaceous material, that is, more than 50 wt. % of the electronic conductor is the carbonaceous material. In the electronic conductor, acetylene black or graphite can be added at a rate not exceeding 50 wt. % of the electronic conductor components.

A binder can be contained in the negative electrode layer. Such a binder can include, for example, polytetrafluoroethylene (PTFE), polyvinylidene fluoride (PVdF), and fluororubber.

The blending ratio of the negative electrode active material, the electronic conductor, and the binder is 70 to 96 wt. % of the negative electrode active material, 2 to 28 wt. % of the electronic conductor, and 2 to 28 wt. % of the binder. If the electronic conductor is contained at less than 2 wt. %, the current collecting performance is lowered, and the high rate characteristic may decline. If the binder is contained at less than 2 wt. %, the binding strength of the compound layer and current collector is lowered, and the cycle performance may drop. On the other hand, from the viewpoint of high capacity, the content each of the electronic conductor and binder is preferred to be 28 wt. % or less.

The negative electrode can be manufactured, for example, by suspending the negative electrode active material, electronic conductor and binder in a proper solvent, applying this suspension on a current collector of aluminum foil or the like, and drying and pressing.

3) Separator

The separator is, for example, a porous separator.

The porous separator is, for example, a porous film including polyethylene, polypropylene, cellulose, or polyvinylidene fluoride (PVdF), a synthetic resin nonwoven fabric, and the like. In particular, a porous film made of polyethylene or polypropylene, or both of them may be preferred because the safety of the secondary battery can be enhanced.

4) Nonaqueous Electrolyte

Examples of the nonaqueous electrolyte include a liquid nonaqueous electrolyte prepared by dissolving an electrolyte in an organic solvent, and others including lithium salt and room temperature molten salt.

A nonaqueous electrolyte will be explained below.

Examples of the electrolyte include lithium perchlorate ($LiClO_4$), lithium hexfluoro phosphate ($LiPF_6$), lithium tetrafluoro borate ($LiBF_4$), lithium hexfluoro arsenate ($LiAsF_6$), lithium trifluoromethasulfonate ($LiCF_3SO_3$), bis-trifluoromethyl sulfonyl imide lithium [$LiN(CF_3SO_2)_2$], and other lithium salts. The electrolyte is preferred to be dissolved in a range of 0.5 to 2 mol/L in an organic solvent.

Examples of the organic solvent can include cyclic carbonate such as ethylene carbonate (EC), propylene carbonate (PC) or vinylene carbonate (VC); chain carbonate such as dimethyl carbonate (DMC), methyl ethyl carbonate (MEC), or diethyl carbonate (DEC); cyclic ether such as tetrahydrofurane (THF) or 2-methyl tetrahydrofurane (2MeTHF); chain ether such as dimethoxy ethane (DME); γ-butyrolactone (BL), acetonitrile (AN), and sulfolane (SL). These organic solvents may be used either alone or as mixture of two or more types.

A nonaqueous electrolyte containing lithium salt and room temperature molten salt will be explained below.

The room temperature molten salt is a salt which is liquid at least in part at room temperature, and the room temperature refers to a range of temperature assumed within normal operation of a power source. Such a temperature range assumed to be in a normal operating range of the power source is about 120° C. or about 60° C. at the upper limit depending on the case, and about −40° C. or about −20° C. at the lower limit depending on the case.

The lithium salt is a lithium salt that has a wide potential window and is generally used in a lithium secondary battery. Examples include $LiBF_4$, $LiPF_6$, $LiClO_4$, $LiCF_3SO_3$, $LiN(CF_3SO_2)_2$, $LiN(C_2F_5SO_2)_2$, $LiN(CF_3SC(C_2F_5SO_2)_3$, etc., but are not limited to them alone. They can be used either alone or as mixture of two or more types.

The content of the lithium salt in the nonaqueous electrolyte is preferred to be 0.1 to 3 mol/L. The reason is as follows. If the content of the lithium salt is less than 0.1 mol/L, the ion conductivity of the nonaqueous electrolyte is lowered, and high rate current and low temperature discharge characteristic may not be obtained. If the content of the lithium salt exceeds 3 mol/L, the melting point of the nonaqueous electrolyte is raised, and it is hard to maintain a liquid form at room temperature. A more preferred range of the lithium salt content is 1 to 2 mol/L.

The room temperature molten salt has a quaternary ammonium organic cation having a skeleton shown in chemical formula (1). Or it can have an imidazolium cation having a skeleton shown in chemical formula (2).

[Chem 1]

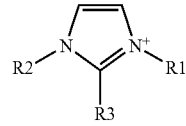

[Chem 2]

where R1 and R2 are $C_nH_{2n+1}$ (n=1 to 6), which can be either equal or different, and R3 is H or $C_nH_{2n+1}$ (n=1 to 6).

The quaternary ammonium organic cation having the skeleton shown in chemical formula (1) includes imidazolium ion such as dialkyl imidazolium and trialkyl imidazolium, tetraalkylammonium ion, alkylpyridinium ion, pyrazolium ion, pyrrolidinium ion, piperidinium ion, etc. In particular, the imidazolium cation having the skeleton shown in chemical formula (2) is preferred.

The tetraalkyl ammonium ion includes trimethyl ethyl ammonium ion, trimethyl ethyl ammonium ion, trimethyl propyl ammonium ion, trimethyl hexyl ammonium ion, and tetrapentyl ammonium ion, but is not limited to them alone.

The alkyl pyridium ion includes N-methyl pyridium ion, N-ethyl pyridinium ion, N-propyl pyridinium ion, N-butyl pyridinium ion, 1-ethyl-2-methylpyridinium ion, 1-butyl-4-methylpyridinium ion, and 1-butyl-2,4 dimethylpyridinium ion, but is not limited to them alone.

These room temperature molten salts having cation can be used either alone, or as mixture of two or more types.

The imidazolium cation having the skeleton shown in chemical formula (2) will be explained below. The dialkyl imidazolium ion includes 1,3-dimethyl imidazolium ion, 1-ethyl-3-methyl imidazolium ion, 1-methyl-3-ethyl imidazolium ion, 1-methyl-3-butyl imidazolium ion, 1-butyl-3-methyl imidazolium ion. The trialkyl imidazolium ion includes 1,2,3-trimethyl imidazolium ion, 1,2-dimethyl-3-ethyl imidazolium ion, 1,2-dimethyl-3-propyl imidazolium ion, and 1-butyl-2,3-dimethyl imidazolium ion, but is not limited to them alone.

These room temperature molten salts having cation can be used either alone, or as mixture of two or more types.

5) Case

A case can be a metal case or a laminate film case.

The metal case can be a metal can made of aluminum, aluminum alloy, iron, stainless steel or the like, in square or cylindrical shape. The plate thickness of the case is preferred to be 0.5 mm or less, or more preferably 0.2 mm or less. The lower limit is preferred to be 0.05 mm.

A laminate film is, for example, a multilayer film including metal foil coated with a resin film. The resin includes polypropylene (PP), polyethylene (PE), nylon, polyethylene terephthalate (PET), and other polymer. A preferred thickness range of the laminate film is 0.2 mm or less. A preferred lower limit of the thickness is 0.05 mm.

The nonaqueous electrolyte battery according to the invention can be applied in nonaqueous electrolyte batteries of various shapes including the prismatic type, cylindrical type, flat type, sheet type, coin type, and the like. An example of a flat type nonaqueous electrolyte battery will be shown in FIG. 1.

This nonaqueous electrolyte battery comprises a bag-shaped film case 6, an electrode group accommodated in the film case, and a nonaqueous electrolyte held by the electrode group. The electrode group comprises a positive electrode 3, a negative electrode 4 and a separator 5 provided between the positive electrode 3 and the negative electrode 4. The electrode group has a structure in which the positive electrode 3, the negative electrode 4 and the separator 5 are flatly wound. This electrode group is manufacture, for example, by flatly winding the positive electrode 3 and negative electrode 4 with the separator 5 interposed therebetween, and pressing and heating. In the electrode group, the positive electrode 3 and the negative electrode 4 can be adhere to the separator 5 by an adhesive polymer. The belt-like positive electrode terminal 2 is connected to the positive electrode 3 at one end, and is drawn outside of the case at the other end. One end of the belt-like negative electrode terminal 1 is connected to the negative electrode 4, and the other end is drawn outside of the case.

The nonaqueous electrolyte secondary battery according to the embodiment of the invention can be used as any charging and discharging system, for example, a power source of a control system for a driving motor of an electric car.

Examples of the invention are described below by referring to the above drawings, but it must be noted, however, that the invention is not limited to these embodiments alone as far as not departing from the scope of the invention.

EXAMPLE 1

A battery having the structure shown in FIG. 1 was fabricated. Examples 2 to 4 and Comparative examples 1 to 4 are same in structure as shown in FIG. 1.

<Preparation of Positive Electrode>

By blending 90 wt. % of lithium cobalt oxide ($LiCoO_2$) as an active material, 3 wt. % of acetylene black, 3 wt. % of graphite, and 4 wt. % of polyvinylidene fluoride (PVdF) in n-methylpyrrolidone (NMP), a slurry was prepared. The slurry was applied on both sides of a current collector made of an aluminum foil of 15 μm in thickness, and dried and pressed, and a positive electrode with electrode density of 3.0 g/cm³ was prepared.

<Preparation of Negative Electrode>

By blending $Li_4Ti_5O_{12}$ as a negative electrode active material, coke with average particle size of 1.12 μm and specific surface area of 82 m²/g as an electronic conductor, and polyvinylidene fluoride (PVdF) by a ratio of 90:5:5 by weight, the mixture was dispersed in n-methylpyrrolidone (NMP) solvent, and a slurry was prepared. The obtained slurry was applied on an aluminum foil of 15 μm in thickness, and dried and pressed, and a negative electrode was prepared. In the coke used herein, the spacing ($d_{002}$) of (002) plane was 0.3504 nm, and the crystallite size (Lc) in the C-axis direction was 1.89 nm. The working potential of this electrode was nobler 1.55 V than the lithium electrode potential. That is, the working potential of this electrode was 1.55 V vs. Li/Li⁺.

<Preparation of Electrode Group>

The positive electrode, a separator of a porous film made of polyethylene of 25 μm in thickness, the negative electrode, and the separator were laminated in this sequence, and wound spirally. By heating and pressing at 90° C., a flat electrode group of 30 mm in width and 3.0 mm in thickness was prepared. The obtained electrode group was put in a pack made of a laminate film that has a thickness of 0.1 mm and comprises an aluminum foil of 40 μm in thickness and a polypropylene layer formed at both sides of the aluminum foil. The electrode group contained in the pack was dried in vacuum at 80° C. for 24 hours.

<Preparation of Liquid Nonaqueous Electrolyte>

Ethylene carbonate (EC) and γ-butyrolactone (BL) were mixed by a ratio by volume (EC:BL) of 25:75. In the obtained mixed solvent, 1.5 mol/L of lithium tetrafluoro borate ($LiBF_4$) was dissolved as an electrolyte, and a liquid nonaqueous electrolyte was prepared.

After pouring the liquid nonaqueous electrolyte into the laminate film pack containing the electrode group, the pack was completely sealed by heat seal, and a nonaqueous electrolyte secondary battery having the structure as shown in FIG. 1, width of 35 mm, thickness of 3.2 mm, and height of 65 mm was prepared.

Similar nonaqueous electrolyte secondary batteries were manufactured in the same manner as in Example 1 except that the spacing ($d_{002}$) of (002) plane and the crystallite size (Lc) in the C-axis direction of coke were changed as shown in Table 1. The obtained secondary batteries were stored in 85° C. environment for 24 hours in a fully charged state, and changes of the battery thickness before and after storage were measured. Results are shown in Table 1, together with the results of other than Example 1.

TABLE 1

| | $d_{002}$ (nm) | | | | |
|---|---|---|---|---|---|
| Lc (nm) | 0.340 | 0.344 | 0.350 | 0.352 | 0.36 |
| 80 | C | C | C | C | C |
| 20 | C | C | C | C | C |
| 10 | C | A | A | A | C |
| 8 | C | A | A | A | C |
| 2 | C | A | A | A | C |
| 0.5 | C | A | A | A | C |
| 0.1 | C | A | A | A | C |
| 0.01 | C | B | B | B | C |
| 0.001 | C | B | B | B | C |

In Table 1, rank A shows the battery thickness changes after cycles of 3% or less, rank B shows changes of more than 3% and 5% or less, and rank C shows changes more than 5%. The secondary battery in Example 1 was 3% or less in the battery thickness change, that is, rank A.

As clear form Table 1, by selecting the spacing ($d_{002}$) of (002) plane of 0.344 nm or more and 0.352 nm or less and the crystallite size (Lc) in the C-axis direction within 10 nm or less, preferably 0.1 nm or more and 10 nm or less, it is understood that the battery having high safety and being suppressed in changes of the battery thickness can be presented.

Battery swelling in high temperature storage varies significantly depending on the surface state of the carbonaceous material to be used as an electronic conductor. To suppress battery swelling due to gas generation, it important to use a carbonaceous material having a proper crystallinity as an electronic conductor. Among them, a carbonaceous material having a crystallinity of the spacing ($d_{002}$) of (002) plane of 0.344 nm or more and 0.352 nm or less is preferred. Since acetylene black having low crystallinity has a great quantity and variety of functional groups on the surface, it is high in reactivity with electrolyte, and gas is generated extremely. In the case of graphite or the like high in crystallinity, on the other hand, the edge surface of graphite is also high in reactivity with the electrolyte, and gas generation is promoted. Owing to this reason, in the case of the battery comprising the carbonaceous material having the spacing ($d_{002}$) of (002) plane of 0.344 nm or more and 0.352 nm or less and the crystallite size Lc of 10 nm or less, even if exposed to high temperature environment, the battery is not swollen, and a stable characteristic can be maintained.

EXAMPLE 2

A nonaqueous electrolyte secondary battery same as in Example 1 was manufactured except that the electronic conductor was replaced by coke of which average particle size is 3.37 μm, specific surface area is 25.7 m²/g, spacing ($d_{002}$) of (002) plane is 0.3472 nm, and crystallite size (Lc) in the C-axis direction is 1.90 nm.

EXAMPLE 3

A nonaqueous electrolyte secondary battery same as in Example 1 was manufactured except that the electronic conductor was replaced by coke of which average particle size is 5.87 μm, specific surface area is 12.7 m²/g, spacing ($d_{002}$) of (002) plane is 0.3443 nm, and crystallite size (Lc) in the C-axis direction is 1.90 nm.

EXAMPLE 4

A nonaqueous electrolyte secondary battery same as in Example 1 was manufactured except that the negative electrode active material was replaced by iron sulfide (FeS).

COMPARATIVE EXAMPLE 1

A nonaqueous electrolyte secondary battery same as in Example 1 was manufactured except that the electronic conductor was replaced by acetylene black of which average particle size is 0.022 μm, specific surface area is 127 m²/g, spacing ($d_{002}$) of (002) plane is 0.3553 nm, and crystallite size (Lc) in the C-axis direction is 1.12 nm, and that the negative electrode active material and the electronic conductor were mixed with polyvinylidene fluoride (PVdF) at a ratio by weight of 90:5:5 to prepare a negative electrode slurry.

COMPARATIVE EXAMPLE 2

A nonaqueous electrolyte secondary battery same as in Example 1 was manufactured except that the electronic conductor was replaced by graphite of which average particle size is 15 μm, specific surface area is 4.25 m²/g, spacing ($d_{002}$) of (002) plane is 0.3356 nm, and crystallite size (Lc) in the C-axis direction is 100 nm, and that the negative electrode active material and the electronic conductor were mixed with polyvinylidene fluoride (PVdF) at a ratio by weight of 90:5:5 to prepare a negative electrode slurry.

COMPARATIVE EXAMPLE 3

A nonaqueous electrolyte secondary battery same as in Comparative example 1 was manufactured except that the negative electrode active material was replaced by iron sulfide (FeS).

COMPARATIVE EXAMPLE 4

A nonaqueous electrolyte secondary battery same as in Comparative example 2 was manufactured except that the negative electrode active material was replaced by iron sulfide (FeS).

In the prepared secondary batteries of Examples 1 to 4 and Comparative examples 1 to 4, discharge capacity maintenance rate at 1 C/0.2 C was measured, and charge and discharge cycle test was conducted.

The charge and discharge cycle test was conducted in the environment of 45° C. Charge and discharge were repeated at current of 1 CmA and in a voltage range of 1 to 3 V. The number of cycles reaching 80% of capacity from the initial capacity is determined as the end of cycle life. Results of the charge and discharge cycle test are summed up in Table 2.

TABLE 2

|  | 1 C/0.2 C capacity ratio | Charge and discharge cycle life (times) | Battery thickness change after cycles (%) |
| --- | --- | --- | --- |
| Example 1 | 98 | 400 | +2% |
| Example 2 | 98 | 350 | +5% |
| Example 3 | 98 | 400 | +3% |
| Example 4 | 98 | 300 | +2% |
| Comparative example 1 | 98 | 100 | +300% |
| Comparative example 2 | 90 | 250 | +5% |
| Comparative example 3 | 98 | 80 | +350% |
| Comparative example 4 | 90 | 200 | +10% |

As a result, in the batteries using the electronic conductor having a proper crystallinity, gas generation was suppressed as compared with batteries using carbon black, and the charge and discharge cycle life was longer. As compared with the batteries using graphite as an electronic conductor, the high rate characteristic was known to be superior. This phenomenon may be explained as follows. In the case of the carbonaceous material of large spacing such as acetylene black, acetylene black has a high reactivity to the electrolyte. Therefore, the electrolyte is reduced and decomposed on the surface of acetylene black, a large amount of gas is generated, so that the cycle life is shortened. In the case of the carbonaceous material of small spacing and large crystallite size such as graphite, reducing decomposition on the graphite surface is suppressed, but the favorable conductive network cannot be built, so that a high rate characteristic declines. On the other hand, by using the electronic conductor in Examples 1 to 4, the two characteristics can be established at the same time.

EXAMPLE 5

Preparation of Negative Electrode

By blending $Li_4Ti_5O_{12}$ powder of which average primary particle size is 0.8 μm as a negative electrode active material, coke 1 having a particle size distribution as shown in Table 3 as an electronic conductor, and polyvinylidene fluoride (PVdF) by a ratio of 90:5:5 by weight, the mixture was dispersed in n-methylpyrrolidone (NMP) solvent, and a slurry was prepared. The obtained slurry was applied on an aluminum foil of 15 μm in thickness, and dried and pressed, and a negative electrode was prepared. In the coke used herein, the spacing ($d_{002}$) of (002) plane was 0.350 nm, and the crystallite size (Lc) in the C-axis direction was 1.89 nm.

The working potential of this electrode was nobler 1.55 V than the lithium electrode potential. That is, the working potential of this electrode was 1.55 V vs. Li/Li+.

<Preparation of Electrode Group>

The positive electrode same as in Example 1, the separator same as in Example 1, the negative electrode, and the separator were laminated in this sequence, and wound spirally. By heating and pressing at 90° C., a flat electrode group of 30 mm in width and 3.0 mm in thickness was prepared. The obtained electrode group was put in a pack made of a laminate film of 0.1 mm in thickness, and dried in vacuum at 80° C. for 24 hours.

The same liquid nonaqueous electrolyte as in Example 1 was poured into the laminate film pack containing the electrode group, the pack was completely closed by heat seal, and a nonaqueous electrolyte secondary battery of the same structure as in FIG. 1 with 35 mm in width, 3.2 mm in thickness, and 65 mm in height was fabricated.

EXAMPLES 6 to 14

Nonaqueous electrolyte secondary batteries same as in Example 5 were manufactured except that cokes 2 to 10 of which particle size distribution is as shown in Table 3 were used.

In the obtained secondary batteries of Examples 5 to 14, a high rate characteristic was measured. The index of the high rate characteristic is the ratio of 5 C current discharge capacity to 0.2 C current discharge capacity.

TABLE 3

| | Type of electronic conductor | D10 (μm) | D50 (μm) | D90 (μm) | 5 C/0.2 C (%) |
|---|---|---|---|---|---|
| Example 5 | Coke 1 | 0.56 | 1.12 | 2.99 | 33 |
| Example 6 | Coke 2 | 0.54 | 1.15 | 3.42 | 45 |
| Example 7 | Coke 3 | 0.89 | 2.54 | 4.81 | 51 |
| Example 8 | Coke 4 | 2.55 | 5.37 | 11.7 | 82 |
| Example 9 | Coke 5 | 2.69 | 6.05 | 12.9 | 90 |
| Example 10 | Coke 6 | 4.68 | 12.8 | 22.2 | 91 |
| Example 11 | Coke 7 | 5.04 | 11.8 | 21.7 | 90 |
| Example 12 | Coke 8 | 9.03 | 15.7 | 28.0 | 75 |
| Example 13 | Coke 9 | 12.3 | 18.2 | 29.2 | 47 |
| Example 14 | Coke 10 | 13.3 | 22.1 | 35.6 | 23 |

As clear from Table 3, in the secondary batteries of Examples 8 to 12 having the electronic conductor with the particle distribution of D10 of 0.1 μm or more and 10 μm or less, D50 of 5 μm or more and 20 μm or less, and D90 of 10 μm or more and 30 μm or less, the ratio of 5 C current discharge capacity to 0.2 C current discharge capacity was higher than in the secondary batteries of Examples 5 to 7, 13, and 14.

The mean primary particle size of the negative electrode active material, the particle size distribution of the electronic conductor, the specific surface area, the spacing ($d_{002}$), and the crystallite size (Lc) in the C-axis direction were measured in the following methods.

<Mean Primary Particle Size of Negative Electrode Active Material, Particle Size Distribution of Electronic Conductor>

To measure the particle size of active material and electronic conductor, a Laser Diffraction Particle Size Analyzer (model SALD-300 of Shimadzu Corporation) was used. About 0.1 g of sample was put in a beaker, a surfactant and 1 to 2 mL of distilled water were added, and stirred sufficiently, and the solution was poured into a stirring water bath. Light intensity distribution was measured 64 times at intervals of 2 seconds, the particle size distribution data was analyzed, and the 50% particle size (D50) of cumulative frequency distribution was determined as an average primary particle size for the active material. As for electronic conductor, from the particle size distribution data, 10% particle size (D10) of cumulative volume distribution, 50% particle size (D50) of cumulative volume distribution, and 90% particle size (D90) of cumulative volume distribution were determined.

<Specific Surface Area of Electronic Conductor by Bet Method>

A measuring apparatus named Autosorb of Yuasa Ionics was used. The sample amount was about 0.5 g. The sample was pretreated by desertion at 120° C. for 15 minutes.

<Measurement of Spacing $d_{002}$ of (002) Plane of Electronic Conductor>

The spacing $d_{002}$ of (002) plane was determined from the powder X-ray diffraction spectrum by a FWHM (full width at half-maximum) middle point method. At this time, Lorentz scattering or other scatter was not corrected.

<Measurement of Crystallite Size Lc of Electronic Conductor>

Crystallite size Lc was measured by an X-ray diffraction method. In measurement data by the X-ray diffraction method, CuKα was used as an X-ray source, and high purity silicon was used as a standard substance. The value of Lc was determined from the position and half-width of each diffraction peak. It was calculated by the FWHM middle point method.

As described herein, the invention provides a nonaqueous electrolyte battery excellent in charge and discharge characteristic in high temperature environment, and high in safety and reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
a case;
a nonaqueous electrolyte provided in the case;
a positive electrode provided in the case; and
a negative electrode provided in the case, including a negative electrode active material and an electronic conductor consisting essentially of a coke,
wherein the negative electrode active material imparts a negative electrode working potential which is 1-2V nobler than a lithium electrode potential, and is selected from the group consisting of tungsten oxide, molybdenum oxide, iron sulfide, titanium sulfide, and lithium titanate, and the coke has a spacing ($d_{002}$) of (002) plane of 0.344 to 0.352 nm, and a crystallite size (Lc) in the C-axis direction of 1.89 nm to 10 nm.

2. The nonaqueous electrolyte battery according to claim 1, wherein the spacing ($d_{002}$) falls within a range of 0.345 to 0.35 nm.

3. The nonaqueous electrolyte battery according to claim 1, wherein the coke has a cumulative volume distribution in which 10% particle size D10 falls within a range of 0.1 μm to 10 μm or less, 50% particle size D50 falls within a range of 5 μm to 20 μm, and 90% particle size D90 falls within a range of 10 μm to 30 μm.

4. The nonaqueous electrolyte battery according to claim 1, wherein the lithium titanate is expressed as $Li_{4+x}Ti_5O_{12}$, where x is in a range of $0 \leq x \leq 3$.

* * * * *